(12) United States Patent
Chen et al.

(10) Patent No.: US 11,400,743 B2
(45) Date of Patent: Aug. 2, 2022

(54) RECORDING MEDIA (71) Applicant: Hewlett-Packard Development Company, L.P., Spring, TX (US)

(72) Inventors: Tao Chen, San Diego, CA (US); Xulong Fu, San Diego, CA (US); Beverly Chou, San Diego, CA (US); Or Brandstein, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/050,941

(22) PCT Filed: Aug. 3, 2018

(86) PCT No.: PCT/US2018/045092
§ 371 (c)(1),
(2) Date: Oct. 27, 2020

(87) PCT Pub. No.: WO2020/027849
PCT Pub. Date: Feb. 6, 2020

(65) Prior Publication Data
US 2021/0229479 A1    Jul. 29, 2021

(51) Int. Cl.
*B41M 5/50*    (2006.01)
*B41M 5/00*    (2006.01)
*B41M 5/52*    (2006.01)

(52) U.S. Cl.
CPC .......... *B41M 5/502* (2013.01); *B41M 5/0017* (2013.01); *B41M 5/5263* (2013.01)

(58) Field of Classification Search
CPC ... B41M 5/502; B41M 5/0017; B41M 5/5263
(Continued)

(56) References Cited

U.S. PATENT DOCUMENTS 7,246,896 B2    7/2007  Askeland et al.
8,609,210 B2    12/2013 Nagoshi et al.
(Continued)

FOREIGN PATENT DOCUMENTS

JP    2005280147    10/2005
KR    20040108216    12/2004
(Continued)

OTHER PUBLICATIONS

BTC Chemical Distribution (Year: 2021).*
(Continued)

*Primary Examiner* — Betelhem Shewareged
(74) *Attorney, Agent, or Firm* — Thorpe North & Western LLP (57) ABSTRACT

The present disclosure is drawn to coated print media, methods of making coated print media, and methods of printing. In one example, a coated print medium can include a substrate, a base coating layer on the substrate, and a top coating layer on the base coating layer. The base coating layer can include an inorganic pigment, a binder, and a fixing agent. The top coating layer can include polyvinyl alcohol and polymer nanobeads having a gloss transition temperature from 70° C. to 350° C. The polyvinyl alcohol and polymer nanobeads can be included at from 50 wt % to 100 wt % by dry weight of the top coating layer.

17 Claims, 2 Drawing Sheets (58) Field of Classification Search
USPC .......................................................... 428/32.3
See application file for complete search history.

(56) References Cited

U.S. PATENT DOCUMENTS

| | | | |
|---|---|---|---|
| 9,370,957 B2 | 6/2016 | Nagoshi | |
| 9,873,985 B2 | 1/2018 | Nagoshi et al. | |
| 2003/0189628 A1* | 10/2003 | Kaga ..................... | B41J 15/005 |
| | | | 347/102 |
| 2004/0161555 A1 | 8/2004 | Niu et al. | |
| 2005/0206705 A1 | 9/2005 | Ma et al. | |
| 2014/0044897 A1 | 2/2014 | Zhou et al. | |
| 2014/0139601 A1* | 5/2014 | Pal ......................... | B41M 5/506 |
| | | | 347/105 |
| 2016/0243870 A1* | 8/2016 | Fu ........................... | B41M 5/504 |
| 2018/0022138 A1 | 1/2018 | Zhou et al. | |
| 2021/0229479 A1* | 7/2021 | Chen ..................... | B41M 5/502 |

FOREIGN PATENT DOCUMENTS

| | | |
|---|---|---|
| WO | 2013015767 | 1/2013 |
| WO | 2014120149 | 8/2014 |
| WO | 2017078729 | 5/2017 |

OTHER PUBLICATIONS

International Search Report dated Dec. 13, 2018 for PCT/US2018/045092, Applicant Hewlett-Packard Development Company, L.P.

* cited by examiner

RECORDING MEDIA

BACKGROUND

Inkjet printing has become a popular way of recording images on various types of media. Some of the reasons include low printer noise, variable content recording, capability of high speed recording, and/or multi-color recording. These features can be obtained at a relatively low price to consumers. As the popularity of inkjet printing increases, the types of use also increase providing demand for new types of inks or recording media. For example, high speed commercial inkjet printers are now used to print large format print jobs that can be easily customized compared to traditional printing presses. These high speed printers can print on media in the form of a continuous roll, or "web." The web can be fed through the printer at high speeds, such as greater than 100 feet per minute.

BRIEF DESCRIPTION OF THE DRAWING

Features of the present disclosure are illustrated by way of example and not limited in the following figures, in which like numerals indicate like elements, and in which.

DETAILED DESCRIPTION

The present disclosure describes coated print media that can have good gloss and image quality, methods of making the coated print media, and methods of printing on the coated print media. In some examples, a coated print medium can include a substrate, a base coating layer on the substrate, and a top coating layer on the base coating layer. The base coating layer can include inorganic pigment, binder, and fixing agent. The top coating layer can include polyvinyl alcohol, polymer nanobeads having a glass transition temperature from 70° C. to 350° C. The polyvinyl alcohol and polymer nanobeads can be included at from 50 wt % to 100 wt % by dry weight of the top coating layer.

In further examples, the polymer nanobeads can include polystyrene, polyacrylate, a polymer of polymerized C1 to C8 alkyl methacrylates, a polymer of polymerized C1 to C8 alkyl acrylates, a polymer of polymerized ethylene glycol methacrylates, a polymer of polymerized ethylene glycol dimethacrylates, a polymer of polymerized methacrylic acids, a polymer of polymerized acrylic acids, polycarbonate, or a combination thereof. In still further examples, the top coating layer may not include fixing agent.

In other examples, the polymer nanobeads can be present in the top coating composition in an amount from 50 wt % to 95 wt % by dry weight of the top coating layer. The polymer nanobeads can have a glass transition temperature from 85° C. to 200° C. or an average particle size from 50 nm to 500 nm, or both.

In still further examples, the fixing agent can be present in the base coating layer in an amount from 1 wt % to 10 wt % and the fixing agent can include a cationic metal salt. In another example, the binder of the base coating layer can include polyvinyl alcohol and a latex having a glass transition temperature from −50° C. to 35° C. In yet another example, the inorganic pigment of the base coating layer can include a combination of calcined clay and calcium carbonate.

In further examples, the base coating layer can have a coat weight from 6-15 grams per square meter and the top coating layer can have a coat weight from 1-6 grams per square meter.

The present disclosure also extends to methods of making coated print media. In one example, a method of making a coated print medium can include applying a base coating composition to a substrate to form a base coating layer and applying a top coating composition over the base coating layer to form a top coating layer on the base coating layer. The base coating composition can include an inorganic pigment, a binder, and a fixing agent. The top coating composition can include polyvinyl alcohol and polymer nanobeads having a glass transition temperature from 70° C. to 350° C. The polyvinyl alcohol and polymer nanobeads can be included in the top coating composition from 50 wt % to 100 wt % by dry weight of the top coating composition.

In another example, the polymer nanobeads can be present in the top coating composition in an amount from 50 wt % to 95 wt % by dry weight of the top coating layer. The polymer nanobeads can have a glass transition temperature from 85° C. to 200° C. or an average particle size from 50 nm to 500 nm, or both. In yet another example, the fixing agent can be present in the base coating composition in an amount from 1 wt % to 10 wt % by dry weight of the base coating composition, and the binder of the base coating composition can include a latex having a glass transition temperature from −50° C. to 35° C. In a further example, the top coating composition may not include fixing agent.

The present disclosure also extends to methods of printing. In one example, a method of printing can include jetting an ink composition onto a coated print medium. The coated print medium can include a substrate, a base coating layer on the substrate, and a top coating layer on the base coating layer. The base coating layer can include an inorganic pigment, a binder, and a fixing agent. The top coating layer can include polyvinyl alcohol and polymer nanobeads having a glass transition temperature from 70° C. to 350° C. The polyvinyl alcohol and polymer nanobeads can be included at from 50 wt % to 100 wt % by dry weight of the top coating layer.

In another example, jetting on the coated print medium can be carried out at a media printing speed of 100 feet per minute to 1,000 feet per minute the ink composition can form a printed image having a 75 degree color gloss of 55 or greater. In yet another example, the coated print medium may not be calendared after jetting the ink composition.

The coated print media described herein can provide excellent gloss, good image quality, and high durability when printed with inkjet ink. Media for inkjet printing is often designed to include various materials and ingredients that can affect gloss, image quality, durability, and other properties. However, in some cases measures used to promote one of these properties can be in conflict with promoting other properties. For example, in some cases certain ingredients can increase the durability or image quality of images printed on the media, but the same ingredients may decrease the glossiness of the media.

High speed ink jet printers can print on rolls of media at a rate of many feet per minute. Such printers can print at printing speeds of greater than 100 feet per minute, up to as high as 1,000 feet per minute, which can provide extra challenges for achieving high durability, gloss, and image quality. The coated print media described herein can provide good gloss, durability, and image quality even when printed with a high speed inkjet printer. The coated print media can include two coating layers that help to enhance some these properties. For example, a base coating layer can include an inorganic pigment, binder, and fixing agent. The base coating layer can be applied to a substrate. A top coating layer can be applied over the base coating layer. The top coating layer can include polyvinyl alcohol and polymer nanobeads having a glass transition temperature from 70° C. to 350° C. These high glass transition temperature polymer nanobeads may not form films at the printing conditions due to their high glass transition temperature. The top coating layer can be made up mostly of the polyvinyl alcohol and polymer nanobeads. For example, the polyvinyl alcohol and polymer nanobeads, together, can make up from 50 wt % to 100 wt % by dry weight of the top coating layer. Without being bound to a particular mechanism, the base coating layer can help to provide high image quality while the top coating layer can provide good gloss and durability. In certain examples, the image quality can also be increased by including fixing agent in the base coating layer and not in the top coating. As such, in some examples the top coating layer may not include fixing agent.

Figure 1:
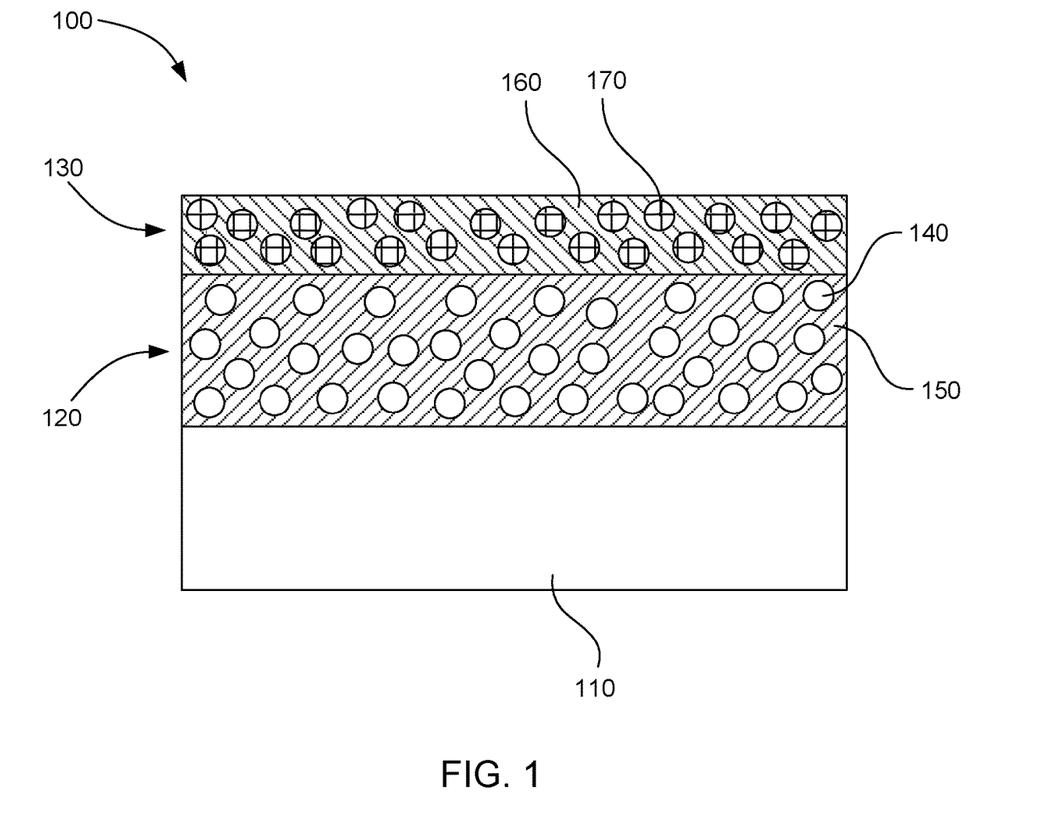
FIG. 1 is a cross-sectional view illustrating an example coated print medium prepared in accordance with examples of the present disclosure.

FIG. 1 shows a cross-sectional view of an example coated print medium 100 according to one example of the present disclosure. The coated print medium includes a substrate 110, a base coating layer 120, and a top coating layer 130. The base coating layer can include inorganic pigment particles 140 in a binder 150. Although not shown in the figure, the base coating layer can also include a fixing agent dispersed in the binder. The top layer includes polyvinyl alcohol 160 and polymer nanobeads 170. The polymer nanobeads can have a high glass transition temperature, such as a glass transition temperature from 70° C. to 350° C. Because of the higher glass transition temperature relative to printing ink temperatures, the polymer nanobeads may not form a film at the temperatures typically encountered during printing. In the example shown in FIG. 1, the top coating layer consists entirely of polyvinyl alcohol and polymer nanobeads. In other examples, the top coating layer may also include other components. However, in some examples the top coating layer can be mostly made up of polyvinyl alcohol and polymer nanobeads, such as being made up of 50 wt % to 100 wt % polyvinyl alcohol and polymer nanobeads.

In some examples, the polymer nanobeads can be made of a polymer or combination of polymers that has a glass transition temperature from 70° C. to 350° C. In certain examples, the polymer nanobeads can have a glass transition temperature from 85° C. to 200° C. or from 95° C. to 150° C.

Glass transition temperature can be measured using differential scanning calorimetry according to ASTM D6604: Standard Practice for Glass Transition Temperatures of Hydrocarbon Resins by Differential Scanning Calorimetry. Differential scanning calorimetry can be used to measure the heat capacity of the polymer across a range of temperatures. The heat capacity can jump over a range of temperatures around the glass transition temperature. The glass transition temperature itself can be defined as the temperature where the heat capacity is halfway between the initial heat capacity at the beginning of the jump and the final heat capacity at the end of the jump.

In further examples, the polymer nanobeads can include a single polymer or a mixture of multiple polymers. The single polymer or mixture of multiple polymers can each have a glass transition temperature within any of the ranges described above. Non-limiting examples of such polymers can include polystyrene, polyacrylate, a polymer made up of polymerized C1 to C8 alkyl methacrylate monomers, a polymer made up of polymerized C1 to C8 alkyl acrylates, a polymer made up of polymerized ethylene glycol methacrylates, a polymer made up of polymerized ethylene glycol dimethacrylates, a polymer made up of polymerized methacrylic acids, a polymer made up of polymerized acrylic acids, polycarbonate, or combinations thereof.

In some examples, the polymer nanobeads can have an average particle size from 50 nm to 500 nm. As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

In certain examples, the polymer nanobeads can be included in the top coating layer in a larger proportion than the polyvinyl alcohol. In one example, the polymer nanobeads can make up more than 50 wt % by dry weight of the top coating layer. In another example, the polymer nanobeads can make up from 50 wt % to 95 wt % by dry weight of the top coating layer. In a further example, the polymer nanobeads can make up from 70 wt % to 90 wt % by dry weight of the top coating layer. In various examples, the amount of polyvinyl alcohol in the top coating layer can be less than 50 wt %, from 1 wt % to 50 wt %, or from 1 wt % to 30 wt % by dry weight of the top coating layer.

In further examples, the polyvinyl alcohol included in the top coating layer can have a weight average molecular weight from 20,000 to 300,000. In still further examples, the polyvinyl alcohol can have a molecular weight from 150,000 to 250,000. In other examples, the polyvinyl alcohol can have a degree of hydrolysis from 75% to 99%.

In some examples, the top coating layer can consist of polyvinyl alcohol and polymer nanobeads. In further examples, the top coating layer can consist essentially of polyvinyl alcohol and polymer nanobeads. In still further examples, the top coating layer can include other additives in addition to polyvinyl alcohol and polymer nanobeads. Non-limiting examples of additives that can be added to the top coating layer can include inorganic pigment, pigment dispersant, a thickener, a flow modifier, a viscosity stabilizer, a pH adjuster, a surfactant, a defoamer, a wetting agent, an antifoamer, a releasing agent, a foaming agent, a penetrant, a coloring dye, a coloring pigment, a white inorganic pigment, a white organic pigment, an optical brightener, an ultraviolet absorber, an antioxidant, a leveling agent, a preservative, a fungicide, an insolubilizer, a wet paper strengthening agent, and/or a dry paper strengthening agent as appropriate. In certain examples, additives other than polyvinyl alcohol and polymer nanobeads can be include in an amount up to 20 wt % by dry weight of the top coating layer.

In certain examples, the top coating layer can be devoid of fixing agent. Fixing agents can include salts such as cationic metal salts. Although fixing agents may be included in base coating layer, it has been found that the image quality can be increased by using a top coating layer that does not include a fixing agent. As used herein, statements that the top coating layer is "devoid" of fixing agent or "does not include" a fixing agent mean that the top coating composition that is applied to form the top coating layer does not include any fixing agent. It is possible that a very small amount fixing agent can diffuse into the top coating layer. However, the top coating layer is still considered to be devoid of fixing agent.

In further examples, the top coating layer can be applied at a coat weight from 1-6 grams per square meter. In certain examples, the top coating layer can be applied at a coat weight from 2-4 grams per square meter. The base coating layer, in some cases, can be applied at a greater coat weight than the top coating layer. In some examples, the base coating layer can be applied at a coat weight from 6-15 grams per square meter. In further examples, the base coating layer can be applied at a coat weight from 10 to 13 grams per square meter.

In some examples, the base coating layer can include an inorganic pigment. The inorganic pigment can include an alumina such as boehmite, hydrated alumina, fumed alumina, etc., a silica such as colloidal silica, precipitated silica, silica gel, fumed silica, etc., titanium dioxide, grounded calcium carbonate, aluminum silicates such as clay, kaolin, calcined clay, etc., or a combination thereof. Thus, the term "inorganic pigment" includes all of these compounds or compositions, or any other compounds or compositions that are inorganic and can provide the function of an inorganic pigment.

In certain examples, the inorganic pigment can be plate-shaped, irregularly-shaped, and/or an irregularly-shaped rhombohedral. In further detail, multiple inorganic pigments can be present of the same or different shape. Examples of plate-shaped and/or irregularly shaped inorganic pigments that can be used include clay, calcined clay, and/or kaolin, for example. In other examples, a plate-shaped inorganic pigment, such as calcined clay, can be present in the base coating layer, by dry weight, at from about 20% to about 50%, from about 30% to about 45%, or from about 35% to about 40%, based on the inorganic pigment content total in the base coating layer.

In another example, calcium carbonate can be included as an inorganic pigment in the base coating layer. In one example, the base coating layer can include ground calcium carbonate having an irregularly-shaped rhombohedral morphology. In further examples, the ground calcium carbonate can have a narrow particle size distribution and low aspect ratio (ratio from the longest axis to the shortest axis, generally being length to width) where 96% by weight of the particles can be less than about 2 microns in diameter, and the aspect ratio can be less than about 5:1, less than about 4:1, or less than about 3:1. With specific reference to the calcium carbonate content, if included, calcium carbonate particles can be included that have a narrow particle size distribution. For example, about 80% or more by weight of the particles can be less than about 1 micron and can fall within the range of about 0.1-1 microns. In another example, the particle size distribution can include about 85% or more by weight of the particles less than about 1 micron and fall in the range of about 0.1-1 microns. In another example, about 98% by weight of the particles can be less than about 2 microns in diameter. Yet another example can include ground calcium carbonate with about 98% by weight of the particles falling in the range of about 0.1-1.0 microns. One example of a ground calcium carbonate having a narrow particle size distribution can be OMYA COVERCARB® 85 ground calcite calcium carbonate (OMYA AG, Oftringen, Switzerland). In another example, the calcium carbonate inorganic pigment can be present in the base coating layer, by dry weight, at from about 40% to about 75%, from about 50% to about 70%, or from about 55% to about 65%, based on the inorganic pigment content total in the base coating layer.

In certain specific examples, the inorganic pigment can include the aluminum silicate, the calcium carbonate, or a combination of both. For example, a combination of the aluminum silicate (e.g., calcined clay) and the calcium carbonate can be present in the base coating layer in an amount of about 85 mass parts per 100 mass parts or greater, about 90 mass parts per 100 mass parts or greater, or about 95 mass parts per 100 mass parts or greater with respect to the total solid content of the total inorganic pigment content, such as 100 mass parts per 100 mass parts of the solid content of the total inorganic pigment. In another example, the inorganic pigment can be a calcined clay in the first coating in an amount of about 40 mass parts per 100 mass parts of the solid content of the total inorganic pigment. In another example, the inorganic pigment can be a ground calcium carbonate in the first coating in an amount of about 60 mass parts per 100 mass parts of the solid content of the total inorganic pigment.

With respect to the entire dry weight of the base coating layer, the total content of inorganic pigment can be from 70 wt % to 95 wt % of the total dry weight of the base coating layer.

In addition to the inorganic pigment, the base coating layer can also include a binder. In various examples, the binder can include a water-dispersible binder, a water-soluble binder, or a combination thereof. Water-dispersible binders can include conjugated diene copolymer latexes, such as styrene-butadiene copolymer or acrylonitrile-butadiene copolymer: acrylic copolymer latexes, such as polymer of acrylic acid ester or methacrylic acid ester or methyl methacrylate-butadiene copolymer; vinyl copolymer latexes, such as ethylene-vinyl acetate copolymer and vinyl chloride-vinyl acetate copolymer; urethane resin latexes; alkyd resin latexes; unsaturated polyester resin latexes; and thermosetting synthetic resins, such as melamine resins and urea resins, and combinations thereof. Water-soluble binders can include starch derivatives such as oxidized starch, etherified starch, and phosphate starch; cellulose derivatives such as methylcellulose, carboxymethylcellulose, and hydroxyethyl cellulose; polyvinyl alcohol derivatives such as polyvinyl alcohol or silanol modified polyvinyl alcohol; natural polymeric resins such as casein, and gelatin or their modified products, soybean protein, pullulan, gum arabic, karaya gum, and albumin or their derivatives; vinyl polymers such as sodium polyacrylate, polyacrylamide, and polyvinylpyrrolidone; sodium alginate; polypropylene glycol; polyethylene glycol; maleic anhydride; or copolymers thereof. In some examples, the binder of the base coating layer can include polyvinyl alcohol and a latex having a glass transition temperature from −50° C. to 35° C. In one example, the binder of the base coating layer can include a styrene-butadiene copolymer, such LITEX® PX 9740 (Synthomer) and a polyvinyl alcohol, such as MOWIOL® 4-98 (Kuraray America Inc.).

In one example, the binder can be present in the base coating layer in an amount of from about 1 wt % to about 18 wt % with respect to the total dry weight of the base coating layer. In another example, the binder can be present in the base coating layer in an amount from about 3 wt % to about 13 wt % with respect to the total dry weight of the base coating layer. As a further example, the binder can be present in the base coating layer in an amount of from about 5 wt % to about 12 wt % with respect to the total dry weight of the base coating layer.

The base coating layer can also include a fixing agent. In some examples, the fixing agent can be a salt of a polyvalent ion, such as a polyvalent anion salt or a polyvalent cation salt. The valency of the ion refers to the overall charge of the ionic species and is determined by the various oxidation states of the metal. Thus, for example, if the polyvalent ion is the cation of the salt, the charge is the overall charge of the cationic species. In an example, a polyvalent cation salt can be a polyvalent metal cation.

Many types of cationic salts can be used as the fixing agent in the base coating layer. Examples of polyvalent cations include, but are not limited to, calcium, cadmium, copper, iron, magnesium, nickel, zinc, aluminum, or zirconium cations and, in particular, $Ca^{+2}$, $Cd^{+2}$, $Cu^{+2}$, $Fe^{+2}$, $Mg^{-2}$, $Ni^{+2}$, $Zn^{+2}$, $Al^{+3}$, $Fe^{+3}$, and $Zr^{+4}$. In further detail, the fixing agent can be a polyvalent cation salt of calcium, cadmium, copper, iron, magnesium, nickel, zinc, aluminum, or zirconium. Non-limiting examples of the salt used as the fixing agent in the base coating layer can include calcium chloride, calcium acetate, calcium nitrate, magnesium chloride, magnesium acetate, magnesium nitrate, magnesium sulfate, barium chloride, barium nitrate, zinc chloride, zinc nitrate, aluminum chloride, aluminum hydroxychloride, and aluminum nitrate. In particular examples, the fixing agent can include $CaCl_2$, $MgCl_2$, $MgSO_4$, $Ca(NO_3)_2$, and $Mg(NO_3)_2$, including hydrated versions of these salts. Combinations of these salts can also be used.

In some examples, the fixing agent can be present in the base coating layer in an amount of about 1 wt % to about 10 wt % by dry weight of the base coating layer. In certain examples, the fixing agent can be present in the base coating layer in an amount from 2 wt % to 4 wt % by dry weight of the base coating layer.

In further examples, the substrate for use in the coated print medium can be a base paper. For example, the substrate can include cellulose fibers and/or non-cellulose fibers, such as synthetic fibers. In some cases, the substrate can also include a polymeric binder. The polymeric binder can be included, for example, when either cellulose or synthetic fibers are used. The cellulose fibers can be made from hardwood or softwood species. The synthetic fibers can be made from polymerization of organic monomers. The substrate can be formed with a pilot paper machine with a pulp, or the like.

A base paper, for example, can be made by various methods of making acid-, neutralized-, or alkaline-papers from paper stuff, including cellulose pulp selected from chemical pulp such as LBKP (Leaf Bleached Kraft Pulp), and/or NBKP (Needle Bleached Kraft Pulp); mechanical pulp such as GP (Groundwood Pulp), PGW (Pressure GroundWood pulp), RMP (Refiner Mechanical Pulp), TMP (ThermoMechanical Pulp), CTMP (ChemiThermoMechanical Pulp), CMP (ChemiMechanical Pulp), and/or CGP (ChemiGroundwood Pulp); and/or waste paper pulp such as DIP (Delnked Pulp) (these can be used alone or in combination).

The substrate can include other additives, such as a pigment dispersant, a thickener, a flow modifier, a defoamer, an antifoamer, a releasing agent, a foaming agent, a penetrant, a coloring dye, a coloring pigment, an optical brightener, an ultraviolet absorber, an antioxidant, a preservative, a fungicide, an insolubilizer, a wet paper strengthening agent, or a dry paper strengthening agent.

The substrate can also have any degree of sizing that does not impair the desired effects of the disclosed coated print medium. The degree of sizing of the substrate can be adjusted by the amount of an internal sizing agent and/or the coating weight of a surface sizing agent that is applied on the base paper. An example of the internal sizing agent for acid base paper is a rosin sizing agent, and examples of the internal sizing agent for acid-free base paper can include alkenyl succinic anhydride, alkyl-ketene dimer, an acid-free rosin sizing agent, and/or a cationic styrene-acryl sizing agent. Examples of the surface sizing agent can include a styrene-acryl sizing agent, an olefin sizing agent, and/or a styrene-maleic sizing agent.

Although the thickness of the substrate is not particularly limited, the substrate can have a thickness of from about 50 μm to about 300 μm, and for example, from about 80 μm to about 250 μm.

In one example, the substrate can be calendered before application of the base coating layer and top coating layer, and in other examples, the substrate might not be calendered prior to application of the first and second coatings.

Figure 2:
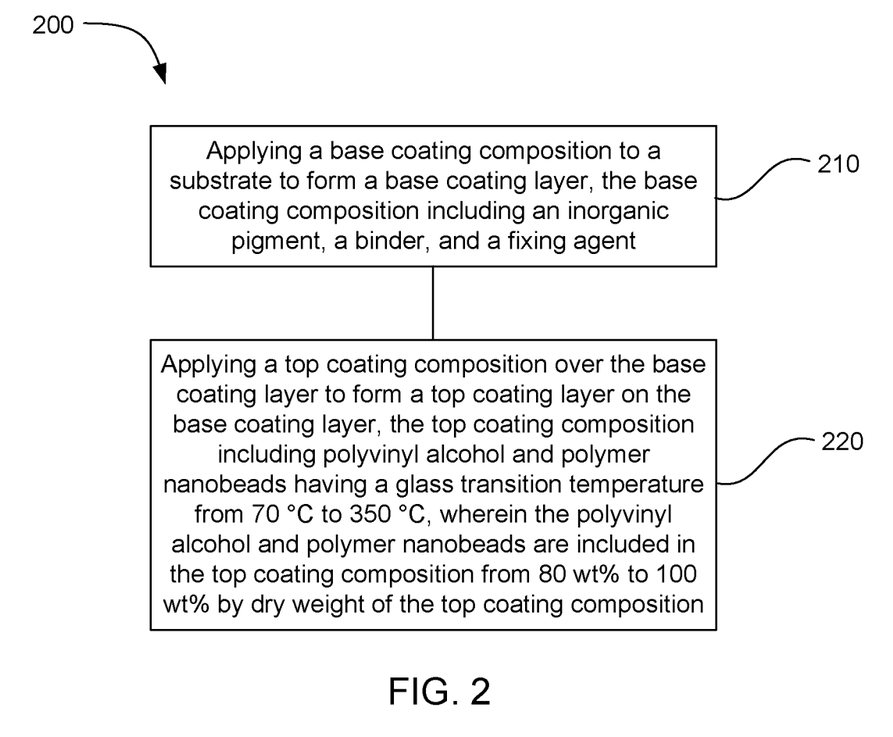
FIG. 2 is a flowchart illustrating an example method of making a coated print medium in accordance with examples of the present disclosure.

The present disclosure also extends to methods of making the coated print media. FIG. 2 is a flowchart of a method 200 of making a coated print medium. The method includes applying 210 a base coating composition to a substrate to form a base coating layer, the base coating composition including an inorganic pigment, a binder, and a fixing agent, and applying 220 a top coating composition over the base coating layer to form a top coating layer on the base coating layer, the top coating composition including polyvinyl alcohol and polymer nanobeads having a glass transition temperature from 70° C. to 350° C., wherein the polyvinyl alcohol and polymer nanobeads are included in the top coating composition from 50 wt % to 100 wt % by dry weight of the top coating composition.

In further examples, methods of making coated print media can include using any of the ingredients described above in the substrate, base coating layer, and top coating layer. In a particular example, the method can include forming the top coating in which polymer nanobeads can be present in an amount from 50 wt % to 95 wt % by dry weight of the top coating layer. In another example, the polymer nanobeads can have a glass transition temperature from 85° C. to 200° C. In yet another example, the polymer nanobeads can have an average particle size from 50 nm to 500 nm.

In additional examples, the base coating composition can be formulated to include the fixing agent in an amount from 1 wt % to 10 wt % by dry weight of the base coating composition. In further examples, the binder of the base coating composition can include a latex having a glass transition temperature from −50° C. to 35° C. In still further examples, the top coating composition can be formulated without a fixing agent.

The method of applying the base coating composition and top coating composition is not particularly limited. For example, the base coating composition can be applied to the substrate and the top coating composition to the base coating layer using a coating device. Examples of the coating device can include, but are not limited to various blade coaters (such as short dwell blade coaters), air knife coaters, roll coaters, bar coaters, or curtain coaters. In a more specific example, the coating device can be a blade coater with jet applicator, a short dwell blade coater, or a blade coater with a roll applicator, which can be suitable for high speed production. In another example, the first and/or second coatings can be applied using a Meyer rod, a slot-die coater, or a curtain coater.

The surface of the base coating layer and top coating layer can be smoothened, as appropriate, by calendering treatment using, for example, a machine calender, a soft nip calender, a super calender, a multistage calender, and/or a multi-nip calender. However, the base coating layer and top coating layer may or may not undergo calendering treatment. In other examples, the coated print medium can be calendered after printing thereon using an inkjet ink composition. Thus, calendering can occur after one or both coating layer applications and/or after printing inkjet ink thereon. In further detail, the surface of the second coating can have a 75-degree gloss value as measure using BYK Gardner Gloss Meter of 55 or more, of 60 or more, or in some instances, 65 or more. The 75-degree gloss value can range from about 55 to about 90, and more typically, from about 60 to about 80.

Figure 3:
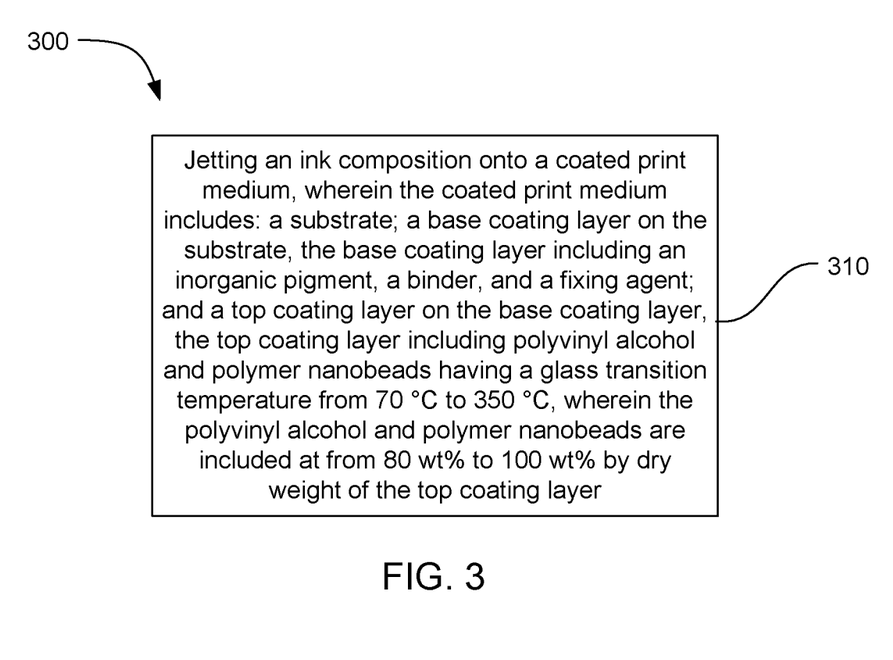
FIG. 3 is a flowchart illustrating an example method of making a coated print medium in accordance with examples of the present disclosure.

FIG. 3 is a flowchart illustrating an example method 300 of printing. The method includes jetting 310 an ink composition onto a coated print medium, wherein the coated print medium includes: a substrate; a base coating layer on the substrate, the base coating layer including an inorganic pigment, a binder, and a fixing agent; and a top coating layer on the base coating layer, the top coating layer including polyvinyl alcohol and polymer nanobeads having a glass transition temperature from 70° C. to 350° C., wherein the polyvinyl alcohol and polymer nanobeads are included at from 50 wt % to 100 wt % by dry weight of the top coating layer.

Images printed on the coated print medium can have high gloss. In certain examples, the ink composition printed on the coated print medium can form a printed image having a 75 degree color gloss of 55 or greater. Color gloss can be measured using a BYK Gardner Gloss Meter at an angle of 75 degrees.

In some examples high gloss can be achieved together with good image quality and durability, even when printing at high speeds. In a particular example, the recording medium can be printed using a high speed inkjet web press, such as an HP PageWide Web Press, for example, printing at a speed of 100 feet per minute (fpm) or more, 200 fpm or more, or 400 fpm or more, for example. In further examples, the print speed can be from 100 fpm to 1000 fpm, from 200 fpm to 800 fpm, from 400 fpm to 1000 fpm, from 100 fpm to 500 fpm, from 200 fpm to 1000 fpm, etc. In some examples, a printing method can include a high-speed web press printing method. A "web press," for example, can be defined to include printing technology encompassing an array of inkjet nozzles that span the width of the paper web. The array can thus be able, for example, to print on 20", 30", and 42", or wider rolled papers. In some examples, the printing methods as described herein can print using a single pass (one-pass), or two-passes. Thus, the paper can pass under each nozzle and printhead a single time, or twice, as opposed to scanning type printers where the printheads move over the same area of paper many times and a fraction of total ink may be used during each pass. One-pass printing puts 100% of the ink from each nozzle/printhead down all at once and is therefore more demanding on the ability of the paper to handle all of the ink in a very short amount of time. In another example, however, the printing method can also encompass a two-pass configuration, which can still be demanding with respect to rapid ink absorption, as two-passes is often fewer passes than is used by other types of printers.

The term "jetting" includes any method in which a stream of droplets of ink are jetted onto the recording medium to form a printed image. The ink composition can be established on the recording medium via any suitable inkjet printing technique. Examples of inkjet methods include charge control methods that uses electrostatic attraction to eject an ink, a drop-on-demand method which uses vibrational pressure of a Piezo element, an acoustic inkjet method in which an electric signal is transformed into an acoustic beam, or a thermal inkjet method that uses pressure caused by bubbles formed by heating ink. In some examples, the ink composition can be applied onto the recording media using inkjet nozzles. In other examples, the ink composition can be applied onto the recording method using thermal inkjet printheads.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and can be determined based on experience and the associated description herein.

As used herein, a plurality of items, structural elements, compositional elements, and/or materials may be presented in a common list for convenience. However, these lists can be construed as though each member of the list is individually identified as a separate and unique member. Thus, no individual member of such list can be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and can be interpreted flexibly to include the numerical values explicitly recited as the limits of the range, and also to include all the individual numerical values or sub-ranges encompassed within that range as if each numerical value and sub-range is explicitly recited. For example, a weight ratio range of about 1 wt % to about 20 wt % can be interpreted to include the explicitly recited limits of 1 wt % and about 20 wt %, and also to include individual weights such as 2 wt %, 11 wt %, 14 wt %, and sub-ranges such as 10 wt % to 20 wt %, 5 wt % to 15 wt %, etc.

As a further note, in the present disclosure, it is noted that when discussing the print media and methods described herein, each of these discussions can be considered applicable to each of these examples, whether or not they are explicitly discussed in the context of that example. Thus, for example, in discussing details about the print media, such discussion also refers to the methods, and vice versa.

EXAMPLES

Several samples of coated print media were made by applying a base coating layer and a top coating layer to a paper substrate. The coatings were applied at the target coat weight using a Meyer rod. The ingredients and coat weights of the coatings in each sample are shown in Table 1. The coatings include Comparative Example 1 (C. EX. 1), Comparative Example 2 (C. EX. 2), Comparative Example 3 (C. EX. 3), Example 1 (EX. 1), and Example 2 (EX. 2).

TABLE 1

| Component | C. EX. 1 | C. EX. 2 | C. EX. 3 | EX. 1 | EX. 2 |
|---|---|---|---|---|---|
| | Dry Parts by Mass | | | | |
| Base Coating | | | | | |
| KaMin ™ 2000c Calcined Clay | 40 | 40 | 40 | 40 | 40 |
| Litex ® PX 9740 | 10 | 10 | 10 | 10 | 10 |
| Mowiol ® 4-98 | 1 | 1 | 1 | 1 | 1 |
| CaCl₂ | 3 | 3 | 3 | 3 | 3 |
| Covercarb ® 85 | 60 | 60 | 60 | 60 | 60 |
| Disponil ® AFX 4030 | 0.3 | 0.3 | 0.3 | 0.3 | 0.3 |
| Coat Weight (g/m²) | 13 | 10 | 10 | 10 | 10 |
| Top Coating | | | | | |
| Raycat ™ 105 | — | 80 | — | — | — |
| Resyn ® 1190 | — | — | 80 | — | — |
| Hycar ® 26459 | — | — | — | 80 | — |
| Raycryl ® 83496 | — | — | — | — | 80 |
| Mowiol ® 40-88 | — | 20 | 20 | 20 | 20 |
| Coat Weight (g/m²) | N/A | 3 | 3 | 3 | 3 |

KaMin™ 2000C is available from KaMin LLC, Macon, Ga. LITEX® PX 9740 is a styrene butadiene latex available from Synthomer, Atlanta, Ga. MOWIOL® 4-98 and Mowiol® 40-88 are polyvinyl alcohols available from Kuraray America Inc. The CaCl₂ is a fixative agent available from Cal-Chlor Corporation, Lafayette, La. OMYA COVERCARB® 85 is a calcium carbonate available from OMYA AG, Oftringen, Switzerland. Disponil® AFX 4030 is a dispersant available from BASF. Raycat™ is a latex available from Specialty Polymers, Inc. Resyn®1190 is a latex available from Celanese. Hycar®25459 is a polymer nanobead available from Lubrizol. The Hycar®25459 average particle size was in the range of 50 nm to 100 nm, as measured using scanning electron microscopy. Raycryl® 83496 is a polymer nanobead available from Specialty Polymers, Inc. The Raycryl® 83496 average particle size was also in the range of 50 nm to 100 nm as measured by scanning electron microscopy.

In the Second Coating, the polyvinyl alcohol is a second binder, such as a polyvinyl alcohol, MOWIOL® 4088 (Kuraray America Inc.). The wetting agent in Reference 2 is a clear liquid nonionic organic surfactant, TEGO® Wet 510 available from Evonik Industries AG. The wetting agent in Samples 1 and 2 is Rhodoline 3300, which is an (alkylphenol ethoxylate)-free nonionic compound from Solvay. The defoamer is a mixture of hydrophobic solids and polysiloxanes, BYK®018 available from Byk. The boehmite alumina hydrate is an inorganic nanoparticle, DISPERSAL® HP14, available from Sasol North America, Inc.

The samples were printed using an HP CM8060 MFP printer with web press inkjet inks in the pens. The prints were made in 2 pass/6 dry spin mode. The prints were then tested for durability. The finger smudge test was performed by placing a finger on the print with sufficient force to bend the finger at the knuckle and the finger was then drawn down. The eraser durability test was performed by mounting a pencil eraser on a force spring to provide a consistent force of 2.25 kg force over a 0.5 square inch eraser area. The eraser was then pressed against the print and drawn down. The durability was rated according to the following scale. 5: no damage; 4: very slight damage; 3: some ink gone; 2: more than half of ink removed; 1: white paper is visible, total ink damage or transfer.

The image quality of the prints was checked on a black line on solid yellow to see how much ink spread from the black line to the yellow color. A blue solid color square was also checked to see how uniform the solid blue color was. The image quality was rated visually according to the following scale. 5: no bleeding and coalescence; 4: very slight bleeding and coalescence; 3: some bleeding and coalescence; 2: significant bleeding and coalescence; 1: ink flow.

The color gloss was measured using a BYK Gardner Gloss Meter at 75 degrees. The color gloss of black, cyan, magenta, yellow, red, green, and blue were measured and the minimum color gloss was reported. The test results are shown in Table 2.

| Test | C. EX. 1 | C. EX. 2 | C. EX. 3 | EX. 1 | EX. 2 |
|---|---|---|---|---|---|
| Image Quality | 5 | 2 | 2 | 5 | 5 |
| Rub Durability | 2 | 2 | 2 | 4.5 | 4.5 |
| Color Gloss | 55 | 46 | 54 | 67 | 67 |

It can be seen that the examples with the top coat that includes high glass transition temperature polymer nanobeads (Example 1 and 2) can have increased gloss, durability and image quality. Hycar® 26459 is a polystyrene nanobead with a glass transition temperature of 105° C. and Raycryl® 83496 is a polyacrylate nanobead with a glass transition temperature of 110° C. In comparison, Raycat™ 105 is a latex with a glass transition temperature of 23° C. and Resyn® 1190 is a latex with a glass transition temperature of 32° C.

Although described specifically throughout the entirety of the instant disclosure, representative examples of the present disclosure have utility over a wide range of applications, and the above discussion is not intended to be construed to be limiting, but is offered as an illustrative discussion of aspects of the disclosure.

What has been described and illustrated herein is an example of the disclosure along with some of its variations. The terms, descriptions, and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A coated print medium, comprising:
   a substrate;
   a base coating layer on the substrate, the base coating layer comprising:
     inorganic pigment,
     binder, and
     fixing agent; and
   a top coating layer on the base coating layer, the top coating layer comprising:
     polyvinyl alcohol, and
     polymer nanobeads having a glass transition temperature from 70° C. to 350° C.,
     wherein the polyvinyl alcohol and polymer nanobeads are included at from 50 wt % to 100 wt % by dry weight of the top coating layer, and wherein the top coating layer is devoid of inorganic pigment.

2. The coated print medium of claim 1, wherein the polymer nanobeads comprise polystyrene, polyacrylate, a polymer of polymerized C1 to C8 alkyl methacrylates, a polymer of polymerized C1 to C8 alkyl acrylates, a polymer of polymerized ethylene glycol methacrylates, a polymer of polymerized ethylene glycol dimethacrylates, a polymer of polymerized methacrylic acids, a polymer of polymerized acrylic acids, polycarbonate, or a combination thereof.

3. The coated print medium of claim 1, wherein the top coating layer does not include fixing agent.

4. The coated print medium of claim 1, wherein the polymer nanobeads are present in the top coating composition in an amount from 50 wt % to 95 wt % by dry weight of the top coating layer, and wherein the polymer nanobeads have a glass transition temperature from 85° C. to 200° C. or an average particle size from 50 nm to 500 nm, or both.

5. The coated print medium of claim 1, wherein the fixing agent is present in the base coating layer in an amount from 1 wt % to 10 wt % and comprises a cationic metal salt.

6. The coated print medium of claim 1, wherein the binder of the base coating layer comprises polyvinyl alcohol and a latex having a glass transition temperature from −50° C. to 35° C.

7. The coated print medium of claim 1, wherein the inorganic pigment of the base coating layer comprises a combination of calcined clay and calcium carbonate.

8. The coated print medium of claim 1, wherein the base coating layer has a coat weight from 6-15 grams per square meter and the top coating layer has a coat weight from 1-6 grams per square meter.

9. A method of making a coated print medium, comprising:
   applying a base coating composition to a substrate to form a base coating layer, the base coating composition comprising an inorganic pigment; a binder, and a fixing agent; and
   applying a top coating composition over the base coating layer to form a top coating layer on the base coating layer, the top coating composition comprising polyvinyl alcohol and polymer nanobeads having a glass transition temperature from 70° C. to 350° C., wherein the polyvinyl alcohol and polymer nanobeads are included in the top coating composition from 80 wt % to 100 wt % by dry weight of the top coating composition, and wherein the top coating layer is devoid of inorganic pigment.

10. The method of claim 9, wherein the polymer nanobeads are present in the top coating composition in an amount from 50 wt % to 95 wt % by dry weight of the top coating layer, and wherein the polymer nanobeads have a glass transition temperature from 85° C. to 200° C. or an average particle size from 50 nm to 500 nm, or both.

11. The method of claim 9, wherein the fixing agent is present in the base coating composition in an amount from 1 wt % to 10 wt % by dry weight of the base coating composition, and wherein the binder of the base coating composition comprises a latex having a glass transition temperature from −50° C. to 35° C.

12. The method of claim 9, wherein the top coating composition does not include fixing agent.

13. A method of printing, comprising jetting an ink composition onto a coated print medium, wherein the coated print medium comprises:
   a substrate;
   a base coating layer on the substrate; the base coating layer comprising:
      an inorganic pigment,
      a binder, and
      a fixing agent; and
   a top coating layer on the base coating layer, the top coating layer comprising:
      polyvinyl alcohol, and
      polymer nanobeads having a glass transition temperature from 70° C. to 350° C.,
      wherein the polyvinyl alcohol and polymer nanobeads are included at from 50 wt % to 100 wt % by dry weight of the top coating layer, and wherein the top coating layer is devoid of inorganic pigment.

14. The method of claim 13, wherein jetting on the coated print medium can be carried out at a media printing speed of and the ink composition forms a printed image having a 75 degree color gloss of 55 or greater.

15. The method of claim 13, wherein the coated print medium is not calendared after jetting the ink composition.

16. The coated print medium of claim 1, wherein the polymer nanobeads are included at from 70 wt % to 90 wt % by dry weight of the top coating layer.

17. The coated print medium of claim 1, wherein the top coating layer consists of the polymer nanobeads and the polyvinyl alcohol.

* * * * *